US009786146B2

(12) United States Patent
Markwell et al.

(10) Patent No.: US 9,786,146 B2
(45) Date of Patent: Oct. 10, 2017

(54) ASSET TRACKING DEVICE CONFIGURED TO SELECTIVELY RETAIN INFORMATION DURING LOSS OF COMMUNICATION

(71) Applicant: 3SI Security Systems, Inc., Malvern, PA (US)

(72) Inventors: Jeffrey Scott Markwell, Winder, GA (US); Daniel James Kilcourse, Snellville, GA (US); Simon Wesley Jones, London (GB); Mary Cecilia Pifer, Telford, PA (US)

(73) Assignee: 3SI SECURITY SYSTEMS, INC., Malvern, PA (US)

( * ) Notice: Subject to any disclaimer, the term of this patent is extended or adjusted under 35 U.S.C. 154(b) by 179 days.

(21) Appl. No.: 14/719,541

(22) Filed: May 22, 2015

(65) Prior Publication Data

US 2016/0343224 A1 Nov. 24, 2016

(51) Int. Cl.
G08B 13/24 (2006.01)
H04W 4/02 (2009.01)
G01S 19/16 (2010.01)
G01S 19/49 (2010.01)
G01S 5/00 (2006.01)

(52) U.S. Cl.
CPC ........ *G08B 13/2462* (2013.01); *G01S 5/0027* (2013.01); *G01S 19/16* (2013.01); *G01S 19/49* (2013.01); *H04W 4/02* (2013.01)

(58) Field of Classification Search
CPC ........ G01S 19/16; G01S 19/49; G01S 5/0027; G08B 13/2462; H04W 4/02
See application file for complete search history.

(56) References Cited

U.S. PATENT DOCUMENTS

| 3,564,525 | A | 2/1971 | Robeson |
| 3,618,059 | A | 11/1971 | Allen |
| 3,828,341 | A | 8/1974 | Carter |
| 4,021,807 | A | 5/1977 | Culpepper |
| 4,511,888 | A | 4/1985 | Bernhardt |
| 4,559,529 | A | 12/1985 | Bernhardt |
| 4,855,713 | A | 8/1989 | Brunius |
| 4,975,680 | A | 12/1990 | Fogle, Jr. |

(Continued)

FOREIGN PATENT DOCUMENTS

| DE | 3400526 | 10/1985 |
| DE | 3530473 | 3/1987 |

(Continued)

OTHER PUBLICATIONS

S-801 Voltage Supervisor IC from SEIKO, May 1999 app note# 104 www.seiko-usa-ecd.com/intcir/products/power/s801.html.

(Continued)

*Primary Examiner* — Sisay Yacob
(74) *Attorney, Agent, or Firm* — RatnerPrestia

(57) ABSTRACT

Devices and methods for generating locational and other pertinent information from a tracking device associated with an asset in need of tracking during a tracking event and for selectively retaining and deleting information stored during a loss of communication between the tracking device and a communication network, to increase probability of retaining information suitable for use as evidence in court or other proceedings in which accurate information is desired regarding the tracking event.

21 Claims, 6 Drawing Sheets

(56) References Cited

U.S. PATENT DOCUMENTS

| | | |
|---|---|---|
| 5,059,949 A | 10/1991 | Caparoni |
| 5,091,713 A | 2/1992 | Horne |
| 5,196,828 A | 3/1993 | Keniston |
| 5,223,844 A | 6/1993 | Mansell |
| 5,266,958 A | 11/1993 | Durboraw, III |
| 5,367,148 A | 11/1994 | Storch |
| 5,392,052 A | 2/1995 | Eberwine |
| 5,448,223 A | 9/1995 | Johnson |
| 5,485,143 A | 1/1996 | Keniston |
| D368,430 S | 4/1996 | Herzog |
| 5,515,032 A | 5/1996 | Johnson |
| 5,554,993 A | 9/1996 | Brickell |
| 5,557,254 A | 9/1996 | Johnson |
| 5,594,425 A | 1/1997 | Ladner |
| 5,642,095 A | 6/1997 | Cook |
| 5,682,133 A | 10/1997 | Johnson |
| 5,748,084 A | 5/1998 | Isikoff |
| 5,838,237 A | 11/1998 | Revell |
| 5,917,433 A | 6/1999 | Keillor et al. |
| 5,952,920 A | 9/1999 | Braddick |
| 6,025,777 A | 2/2000 | Fuller |
| 6,072,396 A | 6/2000 | Gaukel |
| 6,121,922 A | 9/2000 | Mohan |
| 6,246,337 B1 | 6/2001 | Rosenberg |
| 6,249,217 B1 | 6/2001 | Forbes |
| 6,249,245 B1 | 6/2001 | Watters |
| 6,275,143 B1 | 8/2001 | Stobbe |
| 6,353,390 B1 | 3/2002 | Beri |
| 6,362,736 B1 | 3/2002 | Gehlot |
| 6,441,778 B1 | 8/2002 | Durst et al. |
| 6,509,867 B1 | 1/2003 | McGibney |
| 6,510,380 B1 | 1/2003 | Curatolo et al. |
| 6,552,660 B1 | 4/2003 | Lisowski |
| 6,606,556 B2 | 8/2003 | Curatolo et al. |
| 6,628,232 B1 | 9/2003 | Hynes et al. |
| 6,657,587 B1 | 12/2003 | Mohan |
| 6,675,091 B2 | 1/2004 | Navab |
| 6,801,129 B2 | 10/2004 | Grimm |
| 6,889,135 B2 | 5/2005 | Curatolo et al. |
| 6,920,391 B2 | 7/2005 | Daubert et al. |
| 7,026,789 B2 | 4/2006 | Bozzone et al. |
| 7,142,979 B1 | 11/2006 | Shonk |
| 7,171,187 B2 | 1/2007 | Haave |
| 7,183,915 B2 | 2/2007 | Bartholf |
| 7,313,476 B2 | 12/2007 | Nichols et al. |
| 7,319,412 B1 | 1/2008 | Coppinger et al. |
| 7,366,522 B2 | 4/2008 | Thomas |
| 7,411,512 B2 | 8/2008 | Domeier |
| 7,415,355 B2 | 8/2008 | Janky et al. |
| RE40,642 E | 2/2009 | Harrison et al. |
| 7,548,040 B2 | 6/2009 | Lee et al. |
| 7,627,427 B2 | 12/2009 | Nichols et al. |
| 7,647,164 B2 | 1/2010 | Reeves |
| 7,656,292 B2 | 2/2010 | Bartholf |
| 7,761,228 B2 | 7/2010 | Ichimura |
| 7,872,445 B2 | 1/2011 | Hui |
| 7,902,980 B2 | 3/2011 | Grimm |
| 7,948,208 B2 | 5/2011 | Partovi et al. |
| 7,961,081 B2 | 6/2011 | Tomlienovic et al. |
| 8,026,693 B2 | 9/2011 | Burley |
| 8,035,510 B2 | 10/2011 | Pfafman |
| 8,054,037 B2 | 11/2011 | Nagatsuka et al. |
| 8,068,023 B2 | 11/2011 | Dulin |
| 8,159,182 B2 | 4/2012 | Kato et al. |
| 8,169,185 B2 | 5/2012 | Partovi et al. |
| 8,217,791 B2 | 7/2012 | Grimm |
| 8,378,815 B1 | 2/2013 | McNulty |
| 8,643,544 B2 | 2/2014 | Taylor |
| 2001/0040506 A1 | 11/2001 | Boulay |
| 2002/0070874 A1 | 6/2002 | Williams |
| 2003/0179140 A1 | 9/2003 | Patterson |
| 2003/0182055 A1 | 9/2003 | Curatolo et al. |
| 2003/0206117 A1 | 11/2003 | Rosenberg |
| 2004/0192346 A1 | 9/2004 | Chang et al. |
| 2004/0196182 A1 | 10/2004 | Unnold |
| 2005/0017900 A1* | 1/2005 | Grimm ............... G01S 5/0027 |
| | | 342/357.75 |
| 2005/0073406 A1 | 4/2005 | Easley |
| 2005/0128074 A1 | 6/2005 | Culpepper |
| 2005/0246094 A1 | 11/2005 | Moscatiello |
| 2006/0158328 A1 | 7/2006 | Culpepper |
| 2006/0238347 A1 | 10/2006 | Parkinson |
| 2006/0290491 A1 | 12/2006 | Wagner |
| 2007/0081540 A1 | 4/2007 | Crowell |
| 2007/0159343 A1 | 7/2007 | Crucilla |
| 2007/0222595 A1 | 9/2007 | Motteram |
| 2007/0273514 A1 | 11/2007 | Winand |
| 2008/0018496 A1 | 1/2008 | Tanner et al. |
| 2008/0068157 A1 | 3/2008 | Ikemori |
| 2008/0075235 A1 | 3/2008 | Russikoff |
| 2008/0085706 A1 | 4/2008 | Nagata |
| 2008/0088438 A1 | 4/2008 | Aninye |
| 2008/0106399 A1 | 5/2008 | Yaqub |
| 2008/0186163 A1 | 8/2008 | Mills |
| 2009/0061897 A1 | 3/2009 | Hamilton et al. |
| 2009/0096413 A1 | 4/2009 | Partovi et al. |
| 2010/0176950 A1 | 7/2010 | Bartholf |
| 2011/0098058 A1 | 4/2011 | Mahalingam |
| 2011/0148627 A1 | 6/2011 | Grimm |
| 2012/0242485 A1 | 9/2012 | Grimm |
| 2013/0057694 A1 | 3/2013 | Petricoin, Jr. |
| 2013/0321122 A1 | 12/2013 | Lee et al. |
| 2013/0342394 A1 | 12/2013 | Leslie et al. |

FOREIGN PATENT DOCUMENTS

| | | |
|---|---|---|
| DE | 29614823 | 10/1996 |
| DE | 29702771 | 4/1997 |
| DE | 29919554 | 3/2000 |
| DE | 19920128 | 12/2000 |
| EP | 1098205 | 5/2001 |
| EP | 1916850 | 4/2008 |
| EP | 2209097 | 7/2010 |
| EP | 2294563 | 3/2011 |
| FR | 2822277 | 9/2002 |
| GB | 2442798 | 4/2008 |
| WO | 0126067 | 4/2001 |
| WO | 2006121930 | 11/2006 |
| WO | 2009140552 | 11/2009 |

OTHER PUBLICATIONS

Notification of Transmittal and International Search Report for Application No. PCT/US2016/030735, dated Aug. 9, 2016, 11 pages.

* cited by examiner

ASSET TRACKING DEVICE CONFIGURED TO SELECTIVELY RETAIN INFORMATION DURING LOSS OF COMMUNICATION

FIELD OF THE INVENTION

Aspects of the present invention relate to devices and methods for generating and selectively retaining locational and other pertinent information from a tracking device associated with an asset in need of tracking during a tracking event so that data retained during a loss of communication has an increased probability of being useful as evidence in court or other proceedings in which accurate and substantially complete tracking information is desired.

BACKGROUND OF THE INVENTION

In criminal cases, a clear, secure and verifiable chain of evidence is important to achieve successful prosecution of an accused. There are many high profile cases where the mishandling, misplacement or loss of evidence items resulted in the refusal of the authorities to charge a suspect, the dismissal of charges by the judge, or a conclusion by the jury that the charges were not proven beyond a reasonable doubt. Conversely, there have been cases where accused persons may have been unjustly prosecuted or convicted by tainted evidence.

In order to be admissible in court, physical evidence that relates to the issues in a case must be verifiably authentic in order to avoid attack by the parties and exclusion from consideration. Thus, for example, in a criminal case, physical custody of a piece of evidence is carefully documented. In practice, this means that a police officer or detective typically documents the collection and takes charge of a piece of evidence, followed by transfer of the evidence to an evidence clerk for storage in a secure place. These transactions, and every succeeding transaction between the collection of the evidence and its appearance in court, are typically extensively documented chronologically to maximize the ability to withstand legal challenges to the authenticity of the evidence.

Chain of custody may be established with the execution of appropriate evidentiary procedures by those responsible for maintaining the integrity of evidence after collection. However, in some situations, it may be challenging to establish the integrity of evidence collected outside of the presence of police or other relevant authorities. It is nonetheless important for such evidence to be capable of being authenticated to ensure its admissibility or acceptability.

An example of evidence where collection may be problematic is that obtained from tracking devices used for security and related purposes, such as to track currency stolen in a bank robbery. Often, the teller may give the criminal a tracking device disguised as a banded stack of currency bills along with standard wrapped currency. This tracking device is capable of communicating its GPS location to a remote monitoring station as it is being transported by a criminal.

When the tracking device is in communication with a cellular network, information regarding the tracking device location, temperature and the like is typically received at a remote location substantially in real time, or without significant delay. Frequently, however, the tracking device may travel through a location that does not have a strong cellular signal or that does not have a cellular signal at all, that is; the tracking device and its associated asset—here stolen currency—may enter a "dead zone." Alternatively, the tracking device may lose cellular coverage through deliberate action of a person, such as by shielding or blocking of the signal using known means. In such situations, information regarding the handling of the tracking device may still be generated if the satellite signal is still received and the onboard sensors are still active. However, the absence of a cellular signal prevents the information from being transmitted in real or substantially-real time or without significant delay.

Typically, the tracking device is configured to retain information acquired during a dead zone as data that may be stored on the tracking device until the memory is full, at which time additional information may be retained by writing over the earlier data, thus leaving only the later-collected information to be transmitted as data messages when the cellular signal is restored to the device. This results in a tracking device dataset that may not provide information regarding a substantial aspect of the paths travelled by the tracking device from the start of the tracking event to the recovery of the tracking device by the authorities. Accordingly, the dead zone event and lack of consistent data associated therewith may reduce the usefulness with respect to evidentiary reliability of the entire set of data acquired during the tracking event.

As an alternative to writing over data, memory on a tracking device may be conserved if less information is collected, such as by spacing out the time between data acquisition and therefore collecting fewer data points. While this may be an effective method to collect information data when memory size constrains data archiving capability, in order to be used for evidentiary purposes, tracking device information more ideally provides sufficient detail to be accepted as proof of the handling and travel of the tracking device (and its associated asset) during the tracking event. This is especially true when the tracking device is in transit during the tracking event, as may occur, for example, when a robber is fleeing the scene of the crime to evade capture. In such cases, reduction in the frequency at which tracking device information is collected and/or recorded for storage may result in a significant loss of information about the exact path the tracking device traveled and whether the person handling the tracking device stopped along the way. Such stops may signal that a thief off-loaded the currency or other tracked asset or that the identity of the persons handling the tracking device changed. Absence of such information could result in questions being raised about the integrity of the evidence obtainable from the tracking device and, in some cases, lead to inadmissibility of the evidence in a court. Alternatively, incorrect identification of the persons in possession of the tracking device at various times during the tracking event may result in the incorrect persons being prosecuted.

Problems associated with the amount of memory needed for collecting and reporting evidentiary quality tracking device data cannot reliably be solved merely by adding memory modules in the tracking device. Due to the small footprint required to enable tracking devices to be hidden from detection, memory modules are preferably kept as small as possible. This means that, in most circumstances, memory modules cannot merely be added to create additional capability to collect tracking device data just in case the cellular signal is lost during use. Even for applications permitting larger tracking devices to be suitably hidden, such as in an ATM safe, additional memory modules may unacceptably add to the complexity and cost of the tracking device. Irrespective of the size of the memory module in the tracking device, if the length of time that the cellular signal becomes long enough, at some point, the memory capacity of the tracking device may become full.

Thus, there remains a need for methods and devices to enable obtaining evidentiary-quality data from tracking devices associated with assets in need of tracking, even if the device loses communication with a cellular tower for one or more periods during a tracking event, such as a robbery, theft or other event.

SUMMARY OF THE INVENTION

Aspects of the invention relate to devices and methods for generating information from a tracking device that may be associated with an asset in need of tracking during a tracking event so that data retained during a loss of communication has a higher probability of being suitable for use in court or other proceedings in which accurate tracking information is needed. An inventive memory management system retains information about the tracking device path even when the device, and the asset with which it is associated, is present in a location having substantially no cellular service, otherwise known as a "dead zone." Information generated by the tracking device's GPS receiver and onboard sensors is saved in the form of data messages. Certain information generated by the tracking device during each dead zone period is designated as a "message of interest," where such a designation comprises information may comprise one or more of: command and control functionality, GPS location, temperature, latitude, longitude, speed, acceleration/motion and presence or absence of a GPS "fix" (i.e. receipt of GPS data by the on-board GPS receiver).

In a significant aspect, the inventive memory management system designates certain of these data messages as "non-disposable" and others as "disposable." Messages are designated as "disposable" and "non-disposable" in accordance with the likelihood of the respective message giving rise to substantive information about the handling of the tracking device and, therefore, the asset with which it is associated, during each dead zone period. If, during each dead zone period, the memory capacity in the tracking device is reached, at least some of the data messages designated as "disposable" may be deleted to make way for more recent messages, including messages designated as "non-disposable" or "disposable." When the tracking device exits the dead zone and enters a location where cellular service is substantially resumed, at least the archived non-disposable data messages may be uploaded for processing. The inventive memory management enables retention of information relevant for later demonstration of the handling of the tracking device and its associated asset(s) even when the tracking device is subjected to one or more dead zones during a tracking event. Accordingly, the inventive devices and methods increase the likelihood that information obtained from the tracking device during a tracking event is suitable for use as evidence in a court or other proceeding.

Additional advantages of the invention are set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
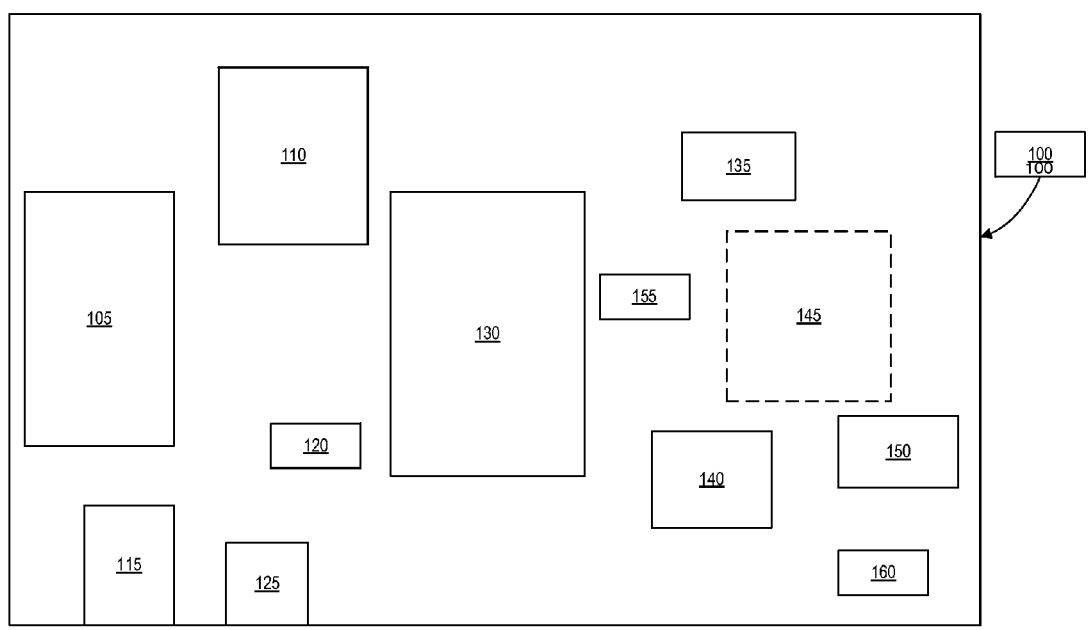
FIG. 1 is a top view schematic diagram of the physical components of an exemplary tracking device of the present invention.

Many aspects of the disclosure can be better understood with reference to the drawings presented herewith. The components in the drawings are not necessarily to scale, emphasis instead being placed upon clearly illustrating the principles of the present disclosure. Moreover, in the drawings, like reference numerals designate corresponding parts throughout the several views. While several implementations are described in connection with these drawings, there is no intent to limit the disclosure to the implementations or implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word substantially, even if the descriptive term is not explicitly modified by the word "substantially."

"Evidence" is a term that is defined as "information presented for the purpose of deciding a disputed question." Evidence may be presented in court and other legal or legal-like proceedings in accordance with legal standards well-known to those of ordinary skill in the art. Examples of evidence used in criminal proceedings are a knife used in a stabbing, a written statement taken from a witness by a police officer or GPS tracking device information recorded from a GPS-enabled device during a search for a missing person or asset. Evidence used in civil or other proceedings includes GPS data of a truck and its driver prior to an accident where people are injured or property damage occurs. Although embodiments of the invention described herein relate to methods for improving the probability of retaining evidence useful for conviction of thieves of tracked assets, it is not a requirement of the invention that the evidence collected be used for any particular purpose or meet any particular evidentiary standard.

The phrase "chain of custody" or "chain of evidence" refers to the accurate auditing control of original evidence material that could potentially be used for legal purposes. The devices and methods disclosed herein are intended to enhance the chain of custody for a tracking device and its associated asset(s) as compared to a tracking device that does not selectively archive information acquired during a dead zone period.

Aspects of the present invention relate to systems and methods for obtaining information generated by a tracking device during a tracking event with increased probability of retaining evidence having an enhanced suitability for use in court or other proceedings where accurate tracking information may be needed. In particular, the inventive tracking devices and methods may acquire and retain such information even when the tracking device is located in one or more areas substantially without cellular service during the tracking event.

A "tracking event" refers to a circumstance in which a user wishes to track the location of the tracking device. An exemplary tracking event has a starting point when the tracking device is activated and an end point when the device is collected and deactivated by the authorities (or other person) for the intention of using the device and its associated asset(s) as evidence in some type of proceeding. During the tracking event, tracking device information generated and transmitted by the tracking device may be reviewed at a remote location substantially in real-time to follow the travel path of the tracking device, and therefore the asset(s) with which the device is associated, or such information may be stored for later review and use as evidence in a court or other proceeding. While the scope of tracking events in which the tracking device may be utilized is expansive, a few non-limiting examples of tracking events are provided.

As a first example, the tracking device may be hidden within a simulated currency bundle in a cashier's drawer. When a robber demands currency from the cashier, the cashier will give the simulated currency bundle bearing the tracking device to the robber along with the genuine currency bundles, at which time the functionality of the tracking device will be activated to start the tracking event. Tracking device functionality may include a plurality of command and control functions, GPS reception capability, cellular communication capability, temperature acquisition capability, latitude and longitude acquisition capability, speed and acceleration/motion determination capability, as well as other information acquisition capability. It is generally desirable not only to recover the currency from a robbery, but to also capture and prosecute the robber(s). In this circumstance, the tracking event desirably continues until the authorities are able to collect the tracking device hidden within the simulated currency bundle and, in some cases, recover the stolen currency. In another example, the tracking device may be hidden in a jewelry package. In this situation, the tracking device may be activated when a thief walks out of the jewelry store with the package and the tracking event desirably continues until the authorities are able to collect the tracking device and, in some cases, the jewelry. Yet further, a tracking device may be utilized to track lots of high value goods, such as smartphones. In this regard, a tracking device may be hidden in one or more genuine or simulated "dummy" packages and placed in a lot (e.g., a carton or pallet) of packages in which the high value goods are incorporated. The package containing the tracking device is activated at the start of a tracking event, such as when the lot of packages is removed from the authorized location, and the tracking event continues until the device, with or without the other packages, is collected by the authorities at the end of the tracking event. A simulated branded pharmaceutical bottle/container may include a tracking device to determine the location and handling of these often-expensive and/or regulated products during transit or to otherwise track their locations, such as, for example, if stolen from a pharmacy. Although as described herein a tracking event may preferably end when the device is recovered, some tracking events may end when no further transmissions are received from the tracking device. In the case, the information collected when the device is transmitting, which may include transmissions of data message retained during one or more dead zone events followed by communication connectivity, may still include useful information that may have enhanced evidentiary value over information gathered from a tracking device without the functionality described herein.

In one aspect, the tracking device is associated with an asset in need of tracking. The asset may be anything of value to someone, such as but not limited to assets which could, if taken by an unauthorized party, be the subject of a prosecution or other court proceeding where evidence is presented. A non-limiting example of such assets includes, currency, all or part of an ATM, lottery tickets, lottery ticket dispensers, smartphones, electronics (e.g., TV's, computers, etc.), jewelry, luxury goods (e.g., designer shoes, purses, watches, etc.), branded pharmaceuticals or controlled substances, high value personal items (briefcases, purses etc.). Any other asset in need of tracking, irrespective of the monetary value of the asset, is also within the scope of this invention.

In broad terms, the tracking device comprises a computer memory having a storage capacity, a cellular signal transmitter (e.g., a modem) configured to transmit cellular signals to a cellular signal receiver, a GPS receiver configured to receive GPS signals from a GPS satellite, an antenna and a battery. The tracking device also comprises motion, acceleration and/or speed sensing capability provided by, for example, an accelerometer. In some aspects, motion sensing capability and tracking device information may be provided by cellular signal mathematical techniques, such as triangulation and the like, but only when the tracking device is in a location where a cellular connectivity is substantially available. The tracking device further comprises a microprocessor in operational communication with the GPS receiver and the cellular signal transmitter and any other componentry of the tracking device as functionally appropriate and as known in the art. When a cellular signal transmitted from the tracking device is received at one or more cellular signal receivers, such as those provided by cell towers, the signal comprising the data messages generated from the tracking device will be suitably re-transmitted to a remote server or the like.

In use, the GPS signals are transmitted to the tracking device from the global GPS satellite network as is well known. The tracking device information, also termed herein as "trackpoints" or "tracking device information," is then transmitted from the tracking device to a remote location by way of a cellular signal to one or more cellular signal receivers, preferably substantially in real time or without significant delay during a tracking event when the tracking device is in a location where communication to the receivers is possible.

In some embodiments, tracking device data, namely information generated by the GPS receiver, onboard sensors and other componentry in the tracking device, is collected by the tracking device for a designated period and then a collection or "packet" of such tracking device data is transmitted by way of the cellular signal. In this regard, the tracking device data may be transmitted as data messages about every 6 seconds. The length between transmission periods may be made shorter or longer without varying the utility or function of the present invention. Each packet of data in the form of data messages may comprise tracking device information collected in the full duration of the previous collection period (e.g., 6 seconds) or each packet of data may comprise a selection of information where such selection is sufficient to provide useful information about the handling of the tracking device during each respective time period. Thus, as used herein, transmission of information "without significant delay" means transmission of information in accordance with routine transmissions in real time, substantially in real time, or in periodic packets in accordance with a predetermined frequency. By contrast, the device will experience a "dead zone" and incur a significant delay in transmission if it is in a location without cellular connectivity for a period of time during which a transmission is scheduled to occur, but cannot because of the loss of connectivity. In a preferred mode of operation, substantially no tracking device information is lost between the transmission of the cellular signal comprising the data messages and the reception of the cellular signal comprising the data messages by the cellular signal receiver. If the cellular signal is determined to be insufficient to support transmission of the data messages, the tracking device is configured to process the data messages in accordance with the inventive memory management protocol disclosed herein.

In one aspect, during a tracking event, the tracking device will provide data messages that include information showing the handling of the tracking device during a tracking event. In a significant aspect, the data messages comprise tracking device information provided from GPS signals. A tracking device may be activated at the commencement of a tracking event by, for example, a tracking device embedded in a simulated currency package being lifted from a storage location by a teller, a tracking device exiting a home location as detected by the GPS receiver, a tracking device being manually switched on, or by any other method known in the art. After the activated device has acquired GPS satellite communication, it will begin to record an "electronic breadcrumb trail" that comprises tracking device information about the locations of the tracking device during a tracking event. Such tracking device information may be used after the conclusion of the tracking event to at least prove the locations and speed of transit of the tracking device, and therefore the associated asset(s), during the tracking event. If the cumulative tracking device information is of sufficient detail to demonstrate locations of the tracking device, and by inference the asset(s) being tracked, the tracking device information may be suitable as evidence in a court or other proceeding where knowledge of the asset location is useful.

As long as the tracking device is substantially in communication with a cellular signal receiver, the tracking device information is transmitted in the form of data messages by the cellular signal transmitter to a remote server or the like, as defined elsewhere herein. In this regard, the tracking device information may be transmitted preferably substantially in real time or otherwise without significant delay to a remote server or to a suitable data storage medium so that the tracking device information may be retained as long as necessary to provide retrievable information regarding the tracking event in question.

In a significant aspect, the tracking device information will be stored in the form of data messages during one or more periods when the tracking device is substantially not in communication with the cellular signal receiver, that is, during one or more dead zone periods that may occur during a tracking event.

In accordance with one aspect of the inventive memory management functionality, when the tracking device enters a dead zone, tracking device information will be stored in the form of data messages. These data messages will be archived as long as the memory capacity of the tracking device is not exceeded. When the tracking device memory is exceeded, the tracking device functionality will then associate at least some of the previously acquired data messages as comprising information that is "of interest" and that should be retained, whereas other information that is "not of interest" may be deleted if the cumulative memory capacity of the tracking device is exceeded. In this regard, tracking device information that is "of interest" will be designated as "non-disposable" and other information that is considered to be "not of interest" will be designated as "disposable." "Non-disposable" data messages may be archived in the tracking device for transmission when a cellular signal is again present, whereas "disposable" data messages may be deleted or otherwise permissively written over by data messages comprising tracking device information generated later in the dead zone period. "Non-disposable" data messages comprise tracking device information not selected to be written over because it serves to provide substantive evidence of the handling of the tracking device during one or more dead zone periods. In particular, evidence that shows substantially all the locations of the tracking device visited during the tracking event, including any time spent in one or more dead zones, has been found to enhance the admissibility or acceptability of the tracking device information in a judicial or other proceeding.

Designations of some information as "of interest" and other as "not of interest" recognize that, in order to be more suitable as evidence in a court, some variation exists in the value of tracking device handling during a dead zone period. As such, deletion of some of the information from the tracking device if memory capacity becomes limited during a dead zone period may improve the overall usefulness, and thus the admissibility, of information obtained from a tracking device. As one example of such differing significances, tracking device information showing substantially all of the locations and the speed traveled by the tracking device, at some level of granularity, may be important to demonstrating the continuity of the movement and other handling of the device from the moment that cellular communication is substantially lost. In particular, investigatory authorities may be interested in the tracking device's overall handling when seen in substantially real time or without significant delay during a tracking event or when recreating the tracking device locations from data that is stored. When cellular communication is resumed, all of the stored tracking device information that was designated as "non-disposable" and stored as data messages during the dead zone period is transmitted, thereby enabling investigating authorities to recreate, for example, the locations of the tracking device, as well as the speed with which it traveled and temperatures to which it was subjected even during the absence of the cellular signal. In other words, the memory management system disclosed herein adopts a methodology directed toward increasing the probability of preserving all or substantially all of the useful tracking device information even if the cellular communication is substantially lost one or more times during a tracking event. Preserving such information may increase the ability to use the tracking device information as evidence in a court or other proceeding.

In one aspect, inventive memory management system identifies a message as of interest and, as such, "non-disposable," if the message provides information relevant to command and control functionality. Such "command and control" functionality may indicate signal jamming, device error conditions, device configuration changes or commands sent to the device from the secure server. Command and control functionality information may provide information that demonstrates that the tracking device data acquisition capability was operational during a dead zone period.

Information regarding the location of the tracking device at the beginning or end of a tracking event is also "of interest." While it is likely not common that the tracking event will start or end during a dead zone, such information may be designated as "non-disposable" if this situation does occur.

In a further aspect, tracking device information generated when the tracking device is substantially not in motion, that is, when the device is stopped or substantially slowed, is also considered to be more important, or at least more informative, than other information that may be generated in a dead zone. This is due, in part, to a heightened likelihood that asset(s) associated with the tracking device may be off-loaded, tampered with or otherwise modified while the tracking device is not moving or moving only very slowly. For example, when tracking bundles of currency from a bank robbery, the robbers may stop to separate the currency among the various parties, and such information would be highly relevant to recreating the events occurring after the robbery and before the authorities gain possession of the tracking device, with or without the stolen currency. Therefore, data messages comprising tracking device information generated while the tracking device is substantially not in motion while in a dead zone will be "of interest" and may comprise an aspect of the "non-disposable" data messages.

Information regarding the first stationary point after the tracking device has been moving is also "of interest" and, as such, may be designated as "non-disposable." Similarly, the first moving point after the tracking device has been stationary is also "of interest" and may be designated as "non-disposable."

Tracking device information generated during a dead zone period also considered to be of interest may further include information regarding loss of a GPS signal or "GPS fix." Similarly, information that shows acquisition of a GPS signal after a previous loss of a GPS signal may also be of interest. Data messages including such information indicate the location where the tracking device may have entered a building, thus designating a residence or a meeting location. When used together, information on loss and later re-acquisition of a GPS signal may provide additional information about the duration that the tracking device was located in a building or the like. Accordingly, information that includes data about the loss and re-acquisition of a GPS signal is designated as "non-disposable."

Further, information about tracking device speed amongst a low or high threshold (or vice versa) may be of interest to demonstrate the handling of the tracking device during a dead zone. For example, if the tracking device speed goes from slow speed to a higher speed, information about when the device was transferred from a pedestrian to a moving car would be useful in an evidentiary context. Conversely, if the tracking device moves from a high speed to a low speed, one might infer the tracking device was moved from a moving vehicle to another mode of transport. As such, any such messages are designated as "non-disposable."

Information about latitude and longitude (as derived from GPS data, as is known in the art) may be useful in providing information about locations that differ from an expected track defined by latitude and longitude coordinates, where deviation from such latitude and longitude coordinates may be assessed by setting thresholds in the tracking device GPS software functionality. For example, a tracking device may travel in a vehicle along a highway for a distance, wherein the location of the highway is defined by a set of longitude and latitude coordinates. If, during that route, the vehicle exits the highway, such as to travel on a side road or unmapped dirt road, private driveway, or inside a building for a distance greater than, for example, an expected threshold from the coordinates that define the highway, this deviation from the expected range of coordinates may indicate that all or part of the asset(s) associated with the tracking device were off-loaded (and possibly buried, submerged in a body of water, etc.) during such a detour, or may otherwise identify a rendezvous point, hideout, or other location of interest to be further investigated. Messages generated during a dead zone period that indicate that the tracking device exceeded the threshold for latitude and longitude may therefore be designated as "non-disposable."

Yet further, the tracking device may comprise a temperature sensor. Information regarding temperature, whether in the form of actual temperature measurements or temperature changes among thresholds may allow inferences that the tracking device was moved from outside to inside of a building, for example. While not every temperature reading from the tracking device may be "of interest," deviations from expected temperature, as defined by thresholds set in the tracking device software instructions, may increase the reliability of tracking device information generated during dead zone periods. Therefore, in some aspects, data messages comprising temperature information are designated as "non-disposable."

Tracking device information considered to be of lesser evidentiary value, at least when assessed in relation to prioritization of data categories when the tracking device memory is limited, is tracking device information obtained when the tracking device is in motion. For example, when the tracking device is in motion, there is a lower likelihood that the assets associated with the device are being off-loaded, tampered with or otherwise modified. With a lot of smartphone packages loaded onto a pallet where the tracking device is hidden in a "dummy" package, it would be unexpected for the smartphone packages to be separated from the pallet while the pallet is in motion. As such, tracking device information obtained when the tracking device is in motion may be designated as "disposable" because it is less likely to be "of interest." Alternatively, only part of the information obtained when the tracking device is moving may be designated as "disposable." For example, every other or every third or every fourth data message may be designated as "disposable," with the other data messages generated when the tracking device is moving being designated as "non-disposable."

Information that may be obtained from the tracking device during a tracking event, as well as a dead zone period, comprises information regarding time (elapsed or absolute), GPS signal strength, cell tower triangulation, closest address to location, tracking device speed and location, battery condition, trigger type, cellular jamming detection and RF beacon status. In some aspects, data messages associated with one or more of these herein referenced conditions may be designated as "non-disposable." In other aspects, data messages associated with one or more of these aspects may be designated as "disposable."

It should be noted that messages including tracking device information designated as "disposable" may not necessarily be deleted from the tracking device. Such disposable data messages may be retained for later transmission if adequate memory is available in the tracking device to store both non-disposable and disposable data messages generated during each dead zone period. However, if, during the dead zone, tracking device memory becomes limited because too many data messages are being stored therein, at least some of such disposable data may be deleted in order to make room for subsequent non-disposable or even newer disposable data messages. Newer disposable data messages are considered more generally of interest than older disposable data.

In one aspect, as the data storage capability approaches or reaches maximum message storage capacity during a dead zone period, the tracking device may be configured to evaluate all messages acquired previously in the dead zone period to determine whether they are of interest; the tracking device functionality may then mark such messages as "non-disposable" or "disposable." For example, when the tracking device capacity approaches being full, or conversely when the available portion of memory available for further storage has been substantially depleted, such as for example, when the capacity reaches about 80 or about 85 or about 90 or about 95 or about 99% message storage capacity, the inventive memory management protocol of the present invention may be implemented. It should be understood that the memory management protocol may also be configured to start deleting disposable messages at any predetermined threshold, including at lesser percentages of capacity at which the portion of available memory may not be reasonably characterized as having become substantially depleted or at which the memory capacity cannot be characterized as approaching being full. In one aspect, the disposable messages may then be deleted to free up memory to allow additional information to be acquired as the dead zone period continues. Alternatively, the tracking device data messages may be marked or tagged as "non-disposable" and "disposable" message as they are acquired. If the messages are marked when acquired, the tracking device may be configured to delete the disposable messages upon such designation. Also when the messages are marked when acquired, the tracking device may be configured to retain such messages until the memory capacity of the tracking device reaches maximum and then deleting them all at the same time or substantially at the same time, thereby freeing up memory for acquisition of additional data messages during the dead zone period. In a further aspect, the disposable messages may be deleted in a progressive fashion if the dead zone period lasts for an extended period. For example, if a GPS data message is generated every six seconds and the dead zone extends for 600 seconds, there may be 100 data messages stored in the tracking device, with many of these likely being characterized as "disposable." In order to enable subsequent data messages to be generated during the extended dead zone at least some of the disposable messages generated previously may be overwritten to so as to preserve as much of the accuracy of the historical tracking device information.

When the cellular signal is again available (i.e. when a dead zone period ends), the data messages comprising the archived tracking device information, including at least the non-disposable messages acquired during the dead zone period, are transmitted via the cellular signal connection. Transmittal of the archived non-disposable messages frees memory in the tracking device to allow additional tracking device data messages to be acquired and processed according to the inventive memory management protocol herein should another dead zone period occur during the tracking event.

In accordance with the present invention, at least some of the tracking device information generated during the dead zone period remains available for use to demonstrate the handling of the tracking device during a tracking event even if the cumulative memory required to store the non-disposable and disposable data messages is exceeded during the period of the dead zone. It has been found by the inventors herein that the inventive memory management protocol described herein may allow evidentiary-quality data to be obtained even though the tracking device may experience one or more dead zones during a tracking event. Moreover, the inventive memory management protocol allows substantially all important tracking device information to be obtained even when the tracking device is out of cellular communication one or more times during a tracking event. In particular, the inventive memory management protocol may allow tracking device information deemed important as evidence to be preferentially preserved over less important tracking device information when the cumulative memory of the tracking device becomes full of tracking device information archived during each dead zone.

Referring now to the drawings, FIG. 1 illustrates an exemplary schematic diagram of the functional aspects of the present invention. Although illustrated as discrete units, the various functional units may be combined into integral units comprising one or more of the functions described herein, and likewise, multiple units may provide functions identified as associated with only a single unit herein. Certain depicted elements, as noted herein, may be optional. Tracking device 100 comprises a number of functional components. Cellular antenna 105 enables reception and transmission of cellular signals generated from modem 110 to a cellular signal receiver such as a cellular tower (not shown). The cellular signal may then be transmitted to a remote server (not shown) or the like for review of the information substantially in real time and/or for archiving. SIM holder 115 provides a location for a SIM card, if any (not shown) for tracking device 100. A user alert unit for providing an audible, visual, or tactile alert to a user (i.e. an individual who deploys the tracking device, not a thief or other person to be tracked), such as a buzzer 120, serves to provide notice to a user of various information relevant to the operation of tracking device 100 (but generally not during a tracking event), such as for example, indicating when the tracking device 100 is properly engaged with the charger. In one aspect, USB 125 may be provided as an input/output port for downloading information to a computer (not shown) or memory stick (not shown) and/or the uploading of updates to the operating software for tracking device 100 from such a computer or memory stick. Software and/or information uploads/downloads to and from tracking device 100 may also take place through the cellular signal by way of modem 110. Battery 130, for example, a lithium-ion battery, serves as a source of power for tracking device 100. In some aspects, tracking device 100 may be powered by use of an inductive charging apparatus (not shown). Use of inductive charging, for example, may demonstrate utility when the tracking device is included in a simulated currency package (as described in relation to FIG. 3) where power is supplied to the battery 130 while the package is in a currency drawer (not shown) or otherwise. Microprocessor 135 includes the operational parameters for tracking device 100, and may also include a clock function for tracking relative or absolute time or this function may be provided by a separate functional unit (not shown) connected to the microprocessor. GPS chipset 140 receives locational signals from the GPS satellite network (not shown). In one non-limiting exemplary embodiment, the GPS antenna 145 may be located on the reverse side of tracking device 100, but the antenna is not limited to any particular placement on the device. Accelerometer 150 provides motion sensing capability for tracking device 100. RF beacon 155 may provide an optional means to locate tracking device 100 using an RF signal receiver (not shown). On/off switch 160 serves as a manual means to activate and deactivate tracking device 100.

Figure 2:
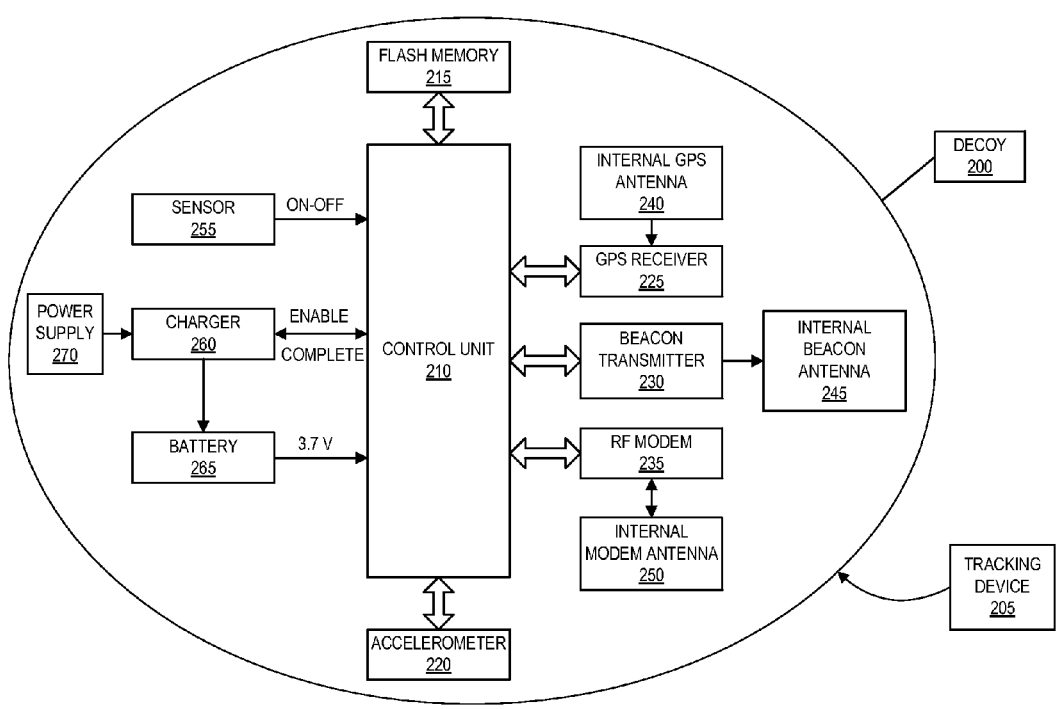
FIG. 2 is a schematic diagram of the operational features of the inventive tracking device of the present invention.

FIG. 2 schematically illustrates an exemplary tracking device. Control unit 210 is in operational communication with flash memory 215, accelerometer 220, GPS receiver 225, beacon transmitter 230 and RF modem 235. Internal GPS antenna 240 is in operational communication with GPS receiver 225 and internal beacon antenna 245 is in operational communication with internal beacon transmitter 230. RF modem 235 is in operational communication with internal modem antenna 250. Sensor 255 is operationally in the off or the on position. Charger 260 is in operational communication with battery 265 and power supply 270.

Figure 3:
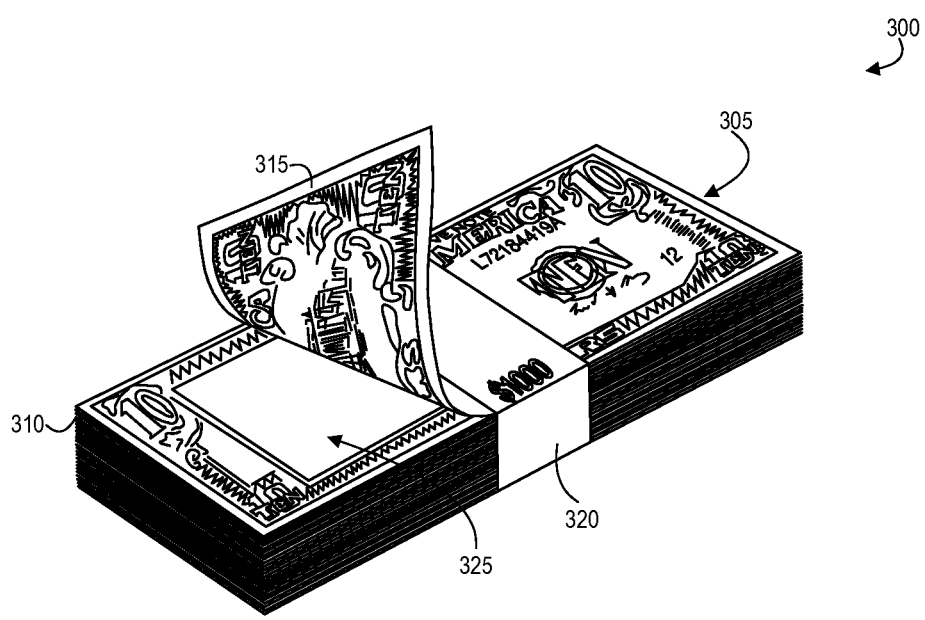
FIG. 3 is an illustration of an exemplary simulated currency bundle within which an exemplary tracking device as disclosed herein may be disposed.

Referring now to FIG. 3, simulated currency bundle 300 is depicted. Simulated currency bundle 300 comprises a stack 305 of currency comprising a plurality 310 of genuine individual bills 315 having a specific denomination, shown here as $10 bills in US currency. Stack 305 is bound with band 320 to form currency bundle 300. Tracking device well 325, typically formed by hollowing out the center of currency bundle 300, is provided for tracking device (not shown) to be concealed therein.

Figure 4:
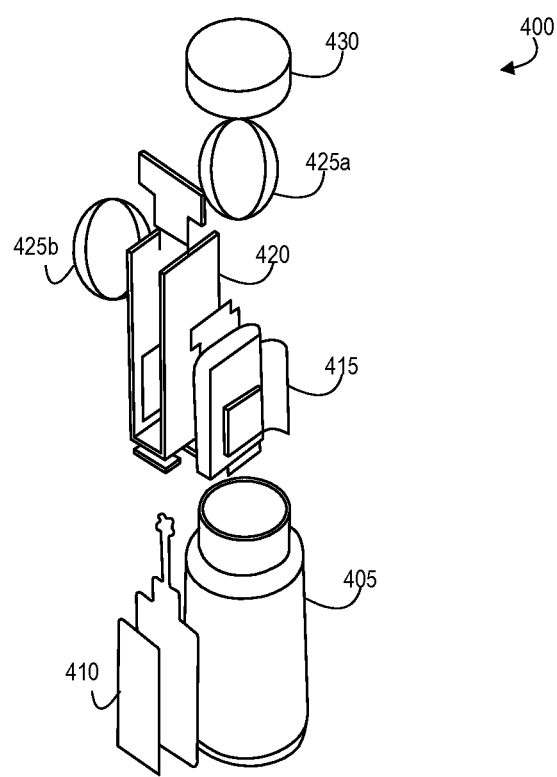
FIG. 4 is an illustration of an exemplary simulated pharmaceutical product container in which an exemplary tracking device as disclosed herein may be disposed.

In FIG. 4, a simulated pharmaceutical package 400 is shown. Simulated pharmaceutical bottle 405 typically comprises a genuine bottle with appropriate labeling (not shown) to make it indistinguishable, without opening it, from a genuine bottle having a drug product incorporated therein. Inductive receiver 410 is incorporated within bottle 400 and may be appropriately engageable with an inductive charging apparatus (not shown). A rolled GPS tracking device 415 having functionality such as that described in FIG. 1 is further included in bottle 405. Insert 420 is included to secure GPS tracking device 415 in bottle 420. Cotton balls 425a and 425b may be included to provide a further secure fit, followed by a seal 430.

Figure 5:
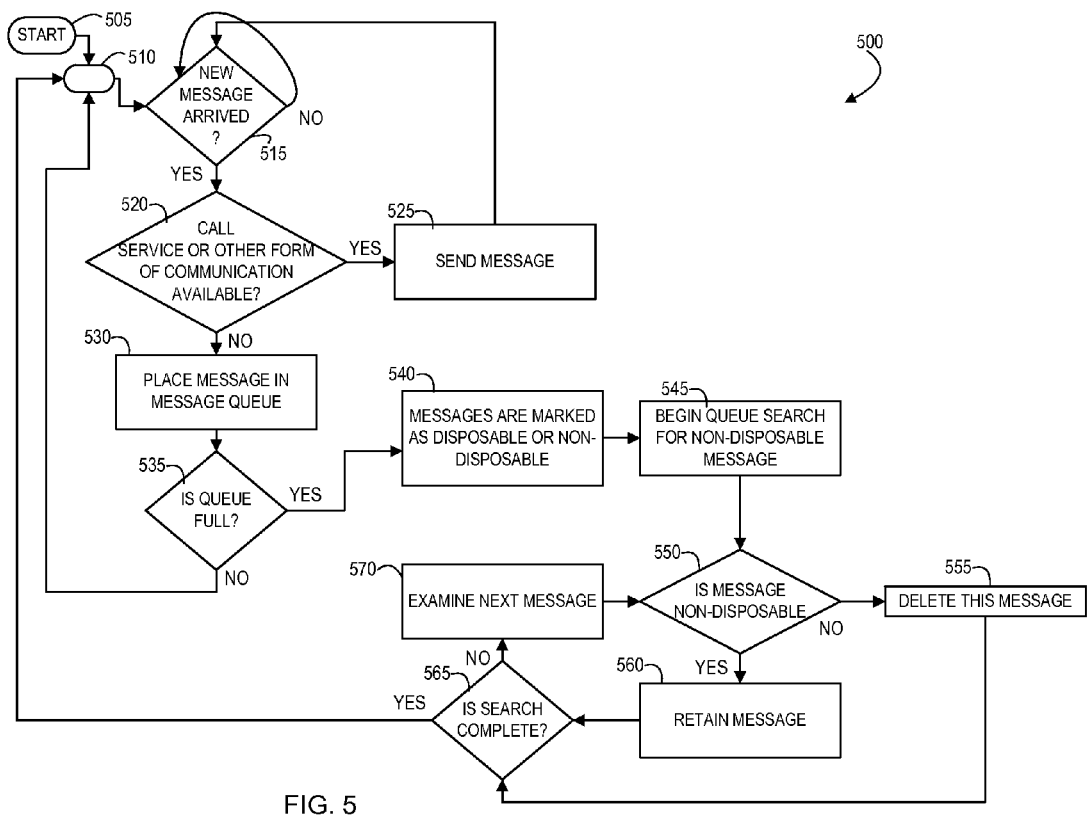
FIG. 5 is an operational diagram of an exemplary method for memory management for use in connection with an exemplary tracking device.

FIG. 5 illustrates an exemplary block diagram for the inventive tracking device and memory management process of the present invention. Referring to overall process 500, block 505 is the starting point for an exemplary memory management protocol conforming to one aspect of the present invention. Block 510 serves to direct decisions from elsewhere in process 500 to block 515 where the processing functionality (not shown) determines whether a new message has arrived in the tracking device (not shown) for processing. If no new message has arrived, a loop returns the process to block 515. If a new message has been received for processing, in block 520 it is determined whether cellular communication is present. If there is cellular communication available, the message is sent in block 525 to, for example, a cellular tower (not shown). If there is no cellular communication present, that is, if the tracking device (not shown) is present in a dead zone, the message is placed in a message queue in block 530. After the message is placed in the message queue in block 530, in block 535 it is determined whether the message queue is full and if it is not, the process returns to block 510 as described previously. If the message queue is full in block 535, the message queue is reviewed in block 540 to determine whether one or more of the plurality of messages in the queue are "of interest," that is, whether one or more messages should be marked as "non-disposable" or "disposable." This process is described in more detail with regard to FIG. 6 below.

Upon marking of the messages as "non-disposable" or "disposable," in block 545 a queue search is conducted for "non-disposable" messages, that is, messages that are more likely to confer evidentiary value to the tracking device information generated during a tracking event as described elsewhere herein. If the message does not comprise a "non-disposable" message as determined in block 550, in block 555 the message may be deleted. In alternatives (not shown) to what is set out in block 555, other message processing procedures may be used to reduce the overall number of messages retained during the dead zone. For example, the message may be retained even though it is marked as "disposable" if the previous "disposable" message was deleted or if the 2 previous messages were deleted. Other processing methodologies for deleting or archiving "disposable" messages may be contemplated by one of ordinary skill in the art.

Referring back to block 550, if the message is "non-disposable" it is retained in block 560 because such message has been deemed to be "of interest" because it confers at least some evidentiary value to the tracking device information obtained during a tracking event, including any associated dead zone periods.

When the search for "disposable" and "non-disposable" messages is not completed in block 565, the next message is queued up for examination in block 570 to then be evaluated in block 550. If the search for "disposable" and "non-disposable" messages is completed in block 565, the process returns to decision node block 510.

Figure 6:
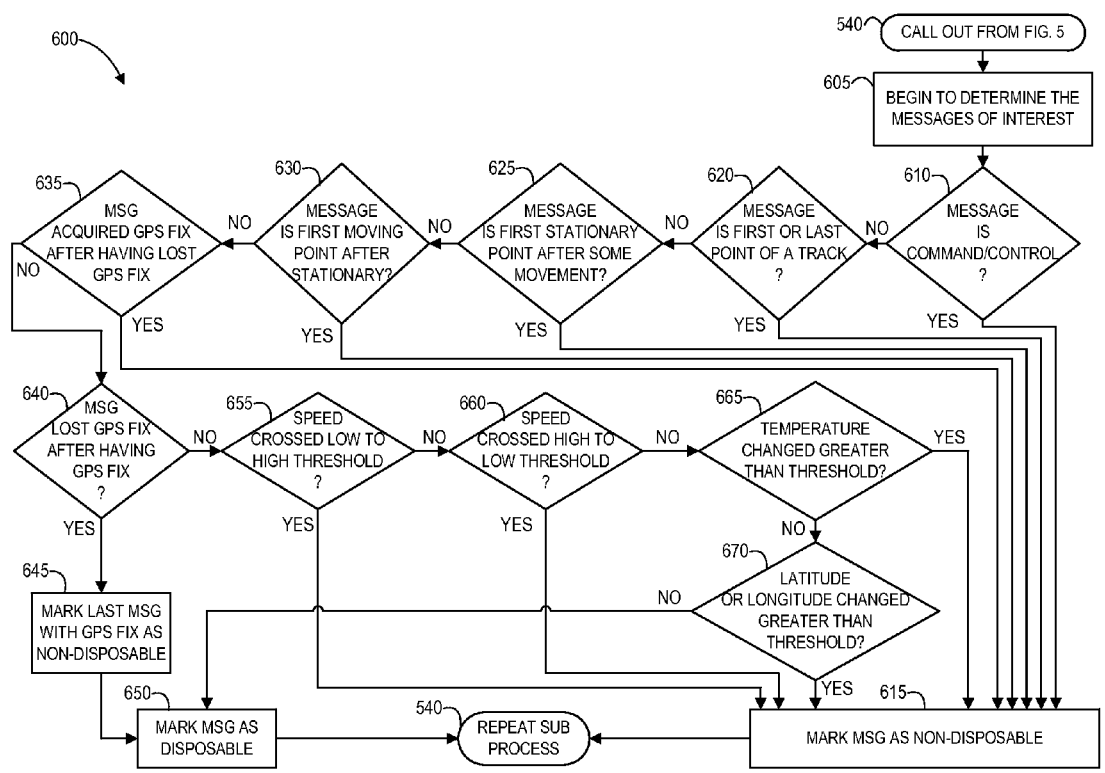
FIG. 6 is an exemplary call-out of a portion of the process set out in FIG. 5.

Referring to FIG. 6, subprocess 600 is a callout from block 540 of FIG. 5. Starting at block 540, tracking device functionality begins determining whether a message should be designated as "disposable" or "non-disposable" at block 605. In block 610, the message is evaluated to determine if it is command and control functionality-related, and if so, the message is marked as "non-disposable" in block 615 and is stored in the message queue for processing as set forth elsewhere herein. If the message does not relate to command and control functionality, the message is evaluated in 620 to assess whether the message is the first or last message generated during the tracking event and, if so, that message is marked as "non-disposable" in block 615. If the message is not the first or last message in block 620, the message is evaluated in block 625 to determine whether the message is the first stationary point after some movement, and, if so, that message is marked as "non-disposable" in block 615. If the message is not the first stationary point after some movement in block 625, the message is evaluated in block 630 to determine whether the message conforms to the first moving point after the tracking device was stationary and, if so, that message is marked as "non-disposable" in block 615. If the message is not the first moving point after stationary in 630, the message is evaluated in 635 to determine whether the message conforms to an acquired GPS fix after having lost a GPS fix and, if so, that message is marked as "non-disposable" in block 615. If the message does not conform to an acquired GPS fix after having lost a GPS fix, that message is evaluated in block 640 to determine whether it is the first message regarding the absence of a GPS fix after a message with the presence of a GPS fix and, if it is such first message, the previous message, with the presence of a GPS fix, is marked as "non-disposable" in block 645. In block 650, GPS-related messages not associated with last GPS fix information may be marked as "disposable." If the message does not conform to information regarding the presence or absence of a GPS fix, the message is then evaluated in block 655 to determine whether that message conforms to information regarding the speed being crossed from a low to a high threshold and, if so, that message is marked as "non-disposable" in block 615. If the message does not conform to information relating to low to high threshold speed, the message is evaluated in block 660 to determine whether that message conforms to information regarding the tracking device speed being crossed from a high to a low threshold and, if so, that message is marked as "non-disposable" in block 615. If the message is not associated with speed threshold information in block 660, in block 665, the message is evaluated to assess whether that message is associated with a change in temperature greater than a threshold and, if so, that message is marked as "non-disposable" in block 615. If the message is not associated with temperature information of interest, in block 670 that message is evaluated to determine whether the message includes information regarding a change in latitude greater than a threshold or longitude greater than a threshold and, if so, that message is marked as "non-disposable" in block 615. If the message does not conform to expected latitude and longitude information, the message is marked as "disposable" in block 650. After processing through the subroutine 600, the process returns to block 540, to repeat, if appropriate. These and other exemplary actions are discussed in more detail hereinabove.

The process set out in FIG. 5 and the subroutine of FIG. 6 are exemplary aspects of the inventive memory management protocol and should not be considered to be limiting. Any process that would allow information that would improve the reliability of information obtained from a tracking device during a dead zone period may be performed. As such, the protocol for message evaluation may be varied with the benefits of the present invention still being provided. For example, the messages could be designated as "disposable" and "non-disposable" at the time they are put in a message queue. At this time these "disposable" message could either be retained until the tracking device memory capacity is reached and then deleted (or some of them deleted) or these "disposable" messages could be deleted (or some of them deleted) immediately after they are tagged.

Any US Patents and Patent Applications referred to herein are hereby incorporated by reference in their entireties by this reference.

What is claimed is:

1. A method of tracking assets comprising:
   a. associating a tracking device with an asset in need of tracking, wherein the tracking device comprises:
      i. computer memory configured to store a plurality of data messages, each message embodying message information, wherein the memory has a storage capacity;
      ii. a global positioning system (GPS) receiver configured to receive GPS information from a GPS satellite network;
      iii. a cellular signal transmitter configured to transmit data messages to a cellular signal receiver;
      iv. a motion sensor configured to generate one or more of speed and acceleration data associated with tracking device movement information; and
      v. a microprocessor in communication with the GPS receiver, the motion sensor and the cellular signal transmitter;
   b. commencing a tracking event upon activation of the tracking device;
   c. transmitting data messages comprising at least the GPS information and tracking device movement information to the cellular signal receiver when the device is substantially in communication with the receiver;
   d. storing information generated by the tracking device as data messages during a period when the tracking device is substantially not in communication with the cellular signal receiver, wherein storage of each data message reduces an available portion of the storage capacity in the computer memory;
   e. comparing a plurality of the stored data messages to at least one of a plurality of retention criteria for determining disposability or non-disposability of the plurality of stored data messages;
   f. designating at least a first one of the plurality of the stored data messages as "non-disposable" in response to the comparison indicating that the message information of the first stored data message meets at least one of the plurality of retention criteria, thereby identifying the stored data message as a message of interest;
   g. designating at least a second one of the plurality of the stored data messages as "disposable" in response to the comparison indicating that the message information of the second stored data message does not meet any of the plurality of retention criteria; and
   h. if the available portion of the storage capacity of the computer memory has reached a predefined threshold, deleting one or more of the stored disposable data messages.

2. The method of claim 1, further comprising the step of transmitting to the cellular signal receiver a plurality of stored data messages including at least one or more stored non-disposable data messages when the tracking device substantially regains communication with the receiver.

3. The method of claim 1, wherein the "non-disposable" data messages embody message information comprising one or more of:
   a. information associated with command and control functionality of the tracking device;
   b. GPS information generated when the tracking device is substantially in motion;
   c. information related to the presence or absence of a GPS fix in the tracking device;
   d. GPS information generated substantially immediately after the tracking device begins moving after being stationary; and
   e. GPS information generated substantially immediately after the device becomes stationary after being in motion.

4. The method of claim 1, wherein the tracking device is further configured to provide information regarding the temperature of the tracking device during the tracking event and wherein the temperature information is stored as temperature-related data messages during each period when the tracking device is substantially not in communication with the cellular signal receiver, and wherein at least some of the temperature-related data messages are designated as "non-disposable".

5. The method of claim 1, wherein the tracking device is further configured to provide information regarding the latitude and longitude of the tracking device during the tracking event and wherein the latitude and longitude information is stored as latitude/longitude-related data messages during each period when the tracking device is substantially not in communication with the cellular signal receiver, and wherein at least some of the latitude/longitude-related data messages are designated as "non-disposable".

6. The method of claim 1, wherein the tracking device is further configured to provide GPS fix information and wherein the GPS fix information is stored as GPS fix-related data messages during each period when the tracking device is substantially not in communication with the cellular signal receiver, and wherein at least some of the GPS fix-related data messages are designated as "non-disposable".

7. The method of claim 1, wherein the tracking event starts when the tracking device is substantially not in communication with the cellular signal receiver and the "non-disposable" data messages further comprise information regarding location of the tracking device substantially at the time the tracking event starts.

8. The method of claim 1, wherein the tracking event ends when the tracking device is substantially not in communication with the cellular signal receiver and the "non-disposable" data messages further comprise information regarding location of the tracking device substantially at the time the tracking event ends.

9. The method of claim 1, wherein the data messages are designated "non-disposable" and "disposable" at or near when the storage capacity of the tracking device memory is substantially reached.

10. The method of claim 1, wherein the data messages are designated "non-disposable" and "disposable" when the messages are generated for storage.

11. The method of claim 1, wherein the asset in need of tracking comprises currency.

12. The method of claim 11, wherein the tracking device is incorporated inside a package of simulated currency.

13. The method of claim 1, wherein the tracking device is incorporated into a package simulating a genuine package, the tracking device package is incorporated into a plurality of genuine packages, and the tracking event comprises a theft of the genuine packages with the incorporated tracking device package.

14. The method of claim 1, wherein the plurality of retention criteria are predetermined to identify as messages of interest for designation as "non-disposable," stored data messages embodying message information having a relatively greater evidentiary value than stored data messages designated as "disposable".

15. A tracking device configured to track assets in need of tracking, wherein the tracking device comprises:
   a. a computer memory configured to store a plurality of data messages, each message embodying message information, wherein the memory has a storage capacity;
   b. a global positioning system (GPS) receiver configured to receive GPS information from a GPS satellite network;
   c. a cellular signal transmitter configured to transmit data messages to a cellular signal receiver;
   d. a motion sensor configured to generate one or more of speed and acceleration data associated with tracking device movement information; and
   e. a microprocessor in communication with the GPS receiver, the motion sensor and the cellular signal transmitter;
   wherein the tracking device is configured to:
      i. identify commencement of a tracking event;
      ii. transmit during the tracking event data messages comprising at least the GPS information and tracking device movement information to the cellular signal receiver when the device is substantially in communication with the receiver;
      iii. store information generated by the tracking device during the tracking event as data messages during a period when the tracking device is substantially not in communication with the cellular signal receiver, wherein storage of each data message reduces an available portion of the available storage capacity in the computer memory,
      iv. compare a plurality of the stored data messages to at least one of a plurality of retention criteria for determining "disposability" or "non-disposability" of the plurality of stored data messages;
      v. designate at least a first one of the plurality of the stored data messages as "non-disposable" in response to the comparison indicating that the message information of the first stored data message meets at least one of the plurality of retention criteria, thereby identifying the stored data message as a message of interest;
      vi. designate at least a second one of the plurality of the stored data messages as "disposable" in response to the comparison indicating that the message information of the second stored data message does not meet any of the plurality of retention criteria;
      vii. delete at least one or more of the stored disposable messages if the available portion of the storage capacity of the computer memory has reached a predefined threshold; and
      viii. transmit to the cellular signal receiver during the tracking event at least the stored non-disposable data messages when the tracking device substantially regains communication with the receiver.

16. The tracking device of claim 15, wherein the "non-disposable" data messages embody message information comprising one or more of:
   a. information associated with command and control functionality of the tracking device;
   b. GPS information generated when the tracking device is substantially in motion;
   c. information related to the presence or absence of a GPS fix in the tracking device;
   d. GPS information generated substantially immediately after the tracking device begins moving after being stationary; and
   e. GPS information generated substantially immediately after the device becomes stationary after being in motion.

17. The tracking device of claim 15, wherein the tracking device is further configured to generate one or more of GPS fix information, temperature information and longitude and latitude information and wherein during the tracking event at least some of the GPS fix information, temperature information or longitude and latitude information is designated as "non-disposable" during a period when the tracking device is substantially not in communication with the cellular signal receiver.

18. The tracking device of claim 15 further comprising a package of simulated currency configured to conceal the tracking device.

19. The tracking device of claim 15 further comprising a package configured to conceal the tracking device, wherein the package comprises a simulation of one or more genuine assets in need of tracking.

20. A method of tracking stolen assets comprising:
   a. associating a concealed tracking device with an asset in need of tracking, wherein the tracking device comprises:
      i. computer memory configured to store a plurality of data messages, each message embodying message information, wherein the memory has a storage capacity;
      ii. a global positioning system (GPS) receiver configured to receive GPS information from a GPS satellite network;

iii. a cellular signal transmitter configured to transmit data messages to a cellular signal receiver;
iv. a motion sensor configured to generate one or more of speed and acceleration data associated with tracking device movement information; and
v. a microprocessor in communication with the GPS receiver, the motion sensor and the cellular signal transmitter;

b. commencing a tracking event upon activation of the tracking device, wherein the tracking event comprises theft of the asset;

c. transmitting data messages comprising at least the GPS information and tracking device movement information to the cellular signal receiver when the device is substantially in communication with the receiver; and d. storing information generated by the tracking device as data messages during a period when the tracking device is substantially not in communication with the cellular signal receiver, wherein storage of each data message reduces an available portion of the storage capacity in the computer memory;

e. comparing a plurality of the stored data messages to at least one of a plurality of retention criteria for determining whether each compared stored data message is "disposable or "non-disposable," the plurality of retention criteria predetermined to identify as "non-disposable" any messages of interest embodying message information with a relatively greater evidentiary value than stored data messages designated as "disposable;"

f. designating at least a first one of the plurality of the stored data messages as "non-disposable" in response to the comparison indicating that the message information of first stored data message meets at least one of the plurality of retention criteria;

g. designating at least a second one of the plurality of the data messages as "disposable" in response to the comparison indicating that the message information of the second stored data message does not meet any of the plurality of retention criteria; and h. transmitting to the cellular signal receiver at least the stored non-disposable data messages when the tracking device substantially regains communication with the receiver, wherein the "non-disposable" data messages comprise message information comprising one or more of:
  i. information associated with command and control functionality of the tracking device;
  ii. GPS information generated when the tracking device is substantially in motion;
  iii. information related to the presence or absence of a GPS fix in the tracking device;
  iv. GPS information generated substantially immediately after the tracking device begins moving after being stationary; and
  v. GPS information generated substantially immediately after the device becomes stationary after being in motion.

21. The method of claim 20, further comprising if the available portion of the storage capacity of the computer memory has reached a predefined threshold, deleting one or more of the stored disposable data messages.

* * * * *